United States Patent Office 2,874,155
Patented Feb. 17, 1959

2,874,155

N-CHLOROPHENOTHIAZINEALKYL-N'-OXOALKYLPIPERAZINES

John W. Cusic, Skokie, and Robert W. Hamilton, Wilmette, Ill., assignors to G. D. Searle & Co., Chicago, Ill., a corporation of Delaware No Drawing. Application January 16, 1957
Serial No. 634,403

6 Claims. (Cl. 260—243)

The present invention relates to a new group of ketonic piperazine derivatives and, more particularly, to compounds of the structural formula

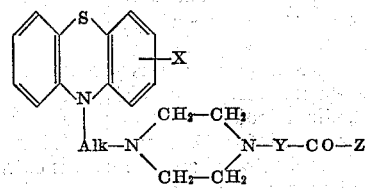

and salts thereof wherein Alk is a lower alkylene radical of two to four carbon atoms, X is fluorine, chlorine or bromine, Y is a lower alkylene radical and Z is a lower alkyl radical.

In the foregoing structural formula Alk represents a lower alkylene radical such as ethylene, trimethylene, propylene, tetramethylene, butylene and the like. Especially potent are the compounds in which Alk is a straight chain or branched three carbon group. The radical Y can represent a straight chain and branched lower alkylene radical such as methylene, ethylene, trimethylene, tetramethylene, propylene, butylene and the like. The radical Z can represent a lower alkyl radical such as methyl, ethyl, straight and branched propyl, butyl and the like.

The organic bases of the foregoing type form pharmaceutically acceptable non-toxic salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The ketones of this invention have valuable pharmaceutical properties and are especially active as anti-inflammatory, anti-emetic and ataractic agents.

The compounds of this invention are conveniently prepared by the condensation of a haloalkylhalophenothiazine of the type

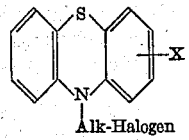

with a piperazine of the type

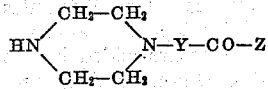

all symbols being defined as hereinabove.

An alternative method for the preparation of these compounds consists in the condensation of a compound of the structure

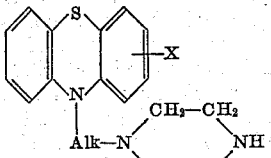

with a compound of the type Halogen-Y—CO—Z. Still another method for preparing these compounds consists in the condensation of a halophenothiazine with a compound of the type Halogen-Alk—N⟨CH$_2$—CH$_2$⟩N—Y—CO—Z The invention will appear more fully from a consideration of the following examples. However, it should be understood that these examples are given by way of illustration only and that the invention is not to be construed as limited in spirit or in scope by the details set forth therein. In these examples temperatures are given uncorrected in degrees centigrade (° C.), quantities in part by weight, and pressures in millimeters of mercury.

Example 1

A mixture of 155 parts of 2-chloro-10-(γ-chloropropyl)phenothiazine, 75 parts of sodium iodide, 216 parts of piperazine and 2000 parts of butanone is refluxed for 8 hours, concentrated and extracted with dilute hydrochloric acid. The extract is rendered alkaline by addition of dilute potassium carbonate and benzene or chloroform extracted. This extract is washed with water, dried over anhydrous potassium carbonate, filtered and evaporated. Vacuum distillation at 0.1 mm. pressure yields 2-chloro-10 - [γ - (N-piperazino)propyl]phenothiazine melting at about 214–218° C.

An agitated mixture of 10 parts of 2-chloro-10-(γ-N-piperazinopropyl)phenothiazine, 2.83 parts of chloroacetone, 2.12 parts of anhydrous potassium carbonate, 4.58 parts of sodium iodide and 200 parts of butanone is refluxed for 16 hours, cooled and filtered. The filtrate is concentrated under vacuum and the residue is extracted with benzene. This extract is washed with water and then extracted with dilute hydrochloric acid. The resulting extract is rendered alkaline by addition of dilute sodium hydroxide, extracted with benzene, dried over anhydrous potassium carbonate, filtered, and concentrated under vacuum. The N-γ-(2-chloro-10-phenothiazine)propyl-N'-(2-oxopropyl)piperazine thus obtained is dissolved in ethanol and treated with 2 mole equivalent of anhydrous hydrogen chloride in 2-propanol. On cooling and standing the dihydrochloride precipitates which is recrystallized repeatedly from ethanol. On heating on the Fischer-Johns block it decomposes at about 200–230° C. In a capillary tube the compound shrinks at about 210° C. and melts with decomposition at about 218–221° C. The salt has the structural formula N-γ-(4-chloro-10-phenothiazine)propyl-N'-(2 - oxopropyl)piperazine is obtained in the same manner from 4-chloro-10-(γ-chloropropyl)phenothiazines. The base can be purified by distillation at about 160–170° C. and 0.5 mm. pressure.

Example 2

A stirred mixture of 18 parts of 2-chloro-10-(γ-N-piperazinopropyl)phenothiazine, 6 parts of 5-chloro-2-pentanone, 8 parts of anhydrous potassium carbonate, 250 parts of butanone and 1 part of sodium iodide is refluxed for 12 hours, cooled and filtered. The filtrate is concentrated to yield an oil. The latter is taken up in benzene, washed with water and extracted with dilute hydrochloric acid. This extract is rendered alkaline and reextracted with benzene. This benzene extract is dried and concentrated. The residue is dissolved in ethanol and treated with hydrogen chloride in 2-propanol to form the dihydrochloride. The base is regenerated from the dihydrochloride and then treated with 2 moles of maleic acid in 2-propanol. On cooling an oil forms which solidifies on standing. After recrystallization from 2-propanol using charcoal decolorization there is obtained the dimaleate of N-γ-(2-chloro-10-phenothiazine)propyl-N'-(4-oxopentyl)piperazine which melts at about 169–170° C. The base has the structural formula

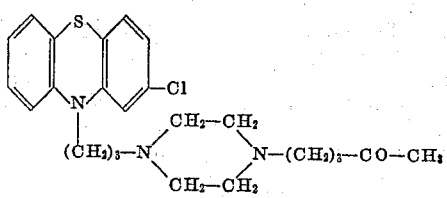

Example 3

2 - chloro - 10 - (β - N - piperazinopropyl)phenothiazine is prepared by the procedure of Example 1 by use of 2-chloro-10-(β-chloropropyl)phenothiazine.

A mixture of 86 parts of this product, 15.1 parts of 1-bromo-2-butanone, 16 parts of potassium carbonate, 2 parts of sodium iodide and 600 parts of butanone is stirred and refluxed for 12 hours and then filtered. The filtrate is concentrated and extracted with toluene. The toluene solution is washed with water and extracted with dilute hydrochloric acid. The acidic solution is rendered alkaline by addition of dilute potassium carbonate, extracted with toluene, dried and concentrated. The residue is distilled at about 230–240° C. and 0.1–0.2 mm. pressure to yield N-(β-2-chloro-10-phenothiazine)propyl-N'-(2-oxobutyl)piperazine which has the structural formula

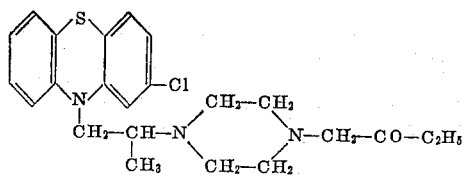

Substitution in the foregoing procedure of 3-chloro-10-(γ-N-piperazinopropyl)phenothiazine yields N-γ-(3-chloro - 10 - phenothiazine)propyl - N' - (2 - oxobutyl)-piperazine which is distilled at about 270–280° C. and 0.8 mm. pressure.

Example 4

13 parts of N-phenyl-4-fluoranthranilic acid are heated to about 270° C. for 90 minutes and then dissolved in ether. The ether solution is washed with 2-N sodium hydroxide and with water and then dried over anhydrous sodium sulfate. After evaporation of the ether the residue is distilled at about 0.05 mm. pressure and 70° C. to yield m-fluorodiphenylamine as a colorless oil. A mixture of 3.7 parts of this oil, 1.3 parts of sulfur and 0.1 part of iodine are heated at 180–185° C. for an hour. The residue is sublimed in vacuum and then crystallized repeatedly from ethanol to yield 2-fluorophenothiazine melting at about 200–201° C.

A solution of 217 parts of 2-fluorophenothiazine in 500 parts of ether is treated under a nitrogen atmosphere by gradual addition with 64 parts of butyl lithium in 500 parts of ether. The mixture is stirred and then treated with 263 parts of δ-chlorobutyl p-toluenesulfonate and 200 parts of ether. After an hour of stirring, there is added a solution of 180 parts of concentrated hydrochloric acid in 300 parts of water, after which the hydrolyzed mixture is filtered. The organic layer is separated from the filtrate, washed with water and concentrated to yield 2-fluoro-10-(δ-chlorobutyl)phenothiazine.

A mixture of 31 parts of this compound, 15 parts of sodium iodide, 43.2 parts of piperazine and 320 parts of butanone is refluxed for 6 hours and then concentrated. The residue is extracted with dilute hydrochloric acid. This extract is rendered alkaline by addition of dilute sodium hydroxide and extracted with hot benzene. The resulting extract is washed with water and dried over anhydrous potassium carbonate, filtered and evaporated to yield 2 - fluoro - 10 - [δ - (N - piperazino)butyl] phenonthiazine.

Treatment of 35.2 parts of this product with 12 parts of 1-chloro-3-pentanone, 16 parts of potassium carbonate, 2 parts of sodium iodide and 600 parts of butanone is stirred and refluxed for 12 hours, cooled and filtered. The filtrate is concentrated and the base is extracted benzene, washed with water and extracted with dilute hydrochloric acid. This extract is rendered alkaline by addition of dilute sodium carbonate, extracted with toluene, dried and concentrated under vacuum to yield N-(δ - 2 - fluoro - 10 - phenothiazine)butyl - N' - (3 - oxopentyl)piperazine which can be distilled at about 260–270° C. and 0.1 to 0.2 mm. pressure.

N - γ - (2 - fluoro - 10 - phenothiazine)propyl - N'-(2-oxopropyl)piperazine is made by an analogous procedure. 2-fluorophenothiazine is treated with the γ-chloropropyl p-toluene sulfonate to yield 2-fluoro-10-(γ-chloropropyl)phenothiazine which is then treated with piperazine by the method of the foregoing example. A stirred mixture of 94 parts of 2-fluoro-10-(γ-N-piperazinopropyl)phenothiazine, 28.3 parts of chloroacetone, 21.2 parts of anhydrous potassium carbonate, 45.8 parts of sodium iodide and 2000 parts of butanone is refluxed for 12 hours, cooled and filtered. The filtrate is concentrated and the base is extracted with benzene, washed with ether and extracted with dilute hydrochloric acid. This extract is rendered alkaline by addition of dilute potassium carbonate, and extracted with benzene. This benzene extract is dried and concentracted to yield N-γ-(2 - fluoro - 10 - phenothiazine)propyl - N' - (2 - oxopropyl)piperazine which is distilled at about 260–270° C. at 0.3 mm. pressure.

Example 5

Use of an equivalent amount of 2-bromo-10-(γ-chloropropyl)phenothiazine instead of the 2-chloro analog yields N-γ-(2-bromo - 10 - phenothiazine)propyl-N'-(2-oxopropyl)piperazine which is distilled at about 260–270° C. and 0.3–0.4 mm. pressure.

Example 6

The haloalkylhalophenothiazines used as intermediates for the preparation of the compounds of the foregoing examples can be advantageously prepared by the following new procedure.

To 234 parts of chlorophenothiazine in 1,650 parts of liquid ammonia are added 73 parts of potassium hydroxide which assays about 85% pure. The solution turns red and the solid dissolves after 15 minutes stirring. The solution is stirred for 2 hours and then 172 parts of 1-chloro-3-bromopropane are added in one portion. The solution is stirred for 3 hours and allowed to stand for 10 hours during which the ammonia evaporates. The residue is taken up in ether, filtered and the filtrate is washed several times with water. It is then dried with anhydrous potassium carbonate. The solvent is evaporated, yielding 2 - chloro - 10 - (γ - chloropropyl)phenothiazine. Small amounts of organic solvent such as ether, acetone or butanone can be added at the beginning of the reaction to facilitate stirring since a gummy solid separates after the addition of the 1-chloro-3-bromopropane.

What is claimed is:
1. A compound of the structural formula

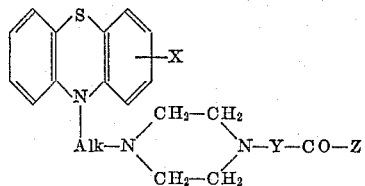

wherein Alk is a lower alkylene radical of two to four carbon atoms, X is a halogen atom of atomic number less than 36, Y is a lower alkylene radical and Z is a lower alkyl radical.

2. A compound of the structural formula

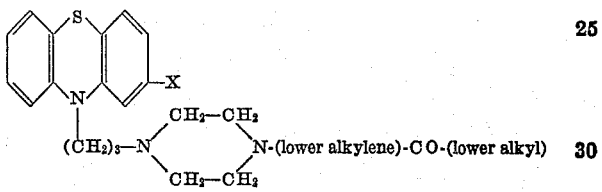

wherein X is a halogen atom of atomic number less than 36.

3.

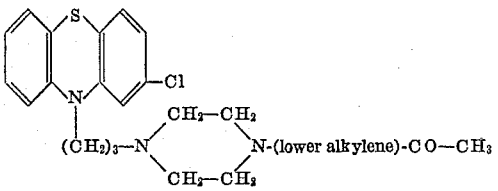

4. N-γ-(2-chloro-10-phenothiazine)propyl - N'-(2-oxopropyl)piperazine.
5. N-γ-(2 - chloro-10-phenothiazine)propyl-N'-(4-oxopentyl)piperazine.
6. N-γ-(2 - bromo-10-phenothiazine)propyl-N'-(2-oxopropyl)piperazine.

References Cited in the file of this patent
FOREIGN PATENTS
203,708   Australia _____ Oct. 20, 1955